(12) United States Patent
Fox et al.

(10) Patent No.: US 12,015,127 B2
(45) Date of Patent: Jun. 18, 2024

(54) ELECTRICAL MODULE ROTISSERIE ASSEMBLY AND ASSOCIATED METHOD OF USE

(71) Applicant: Rivian IP Holdings, LLC, Plymouth, MI (US)

(72) Inventors: Dustin Fox, Bloomington, IL (US); Timothy Atkinson, Kankakee, IL (US); Quinn Roels, Normal, IL (US)

(73) Assignee: Rivian IP Holdings, LLC, Irvine, CA (US)

( * ) Notice: Subject to any disclaimer, the term of this patent is extended or adjusted under 35 U.S.C. 154(b) by 146 days.

(21) Appl. No.: 17/507,114

(22) Filed: Oct. 21, 2021

(65) Prior Publication Data

US 2023/0130949 A1    Apr. 27, 2023

(51) Int. Cl.
*H01M 10/42*    (2006.01)

(52) U.S. Cl.
CPC ..... *H01M 10/4285* (2013.01); *H01M 10/425* (2013.01)

(58) Field of Classification Search
CPC ........... H01M 10/4285; H01M 10/425; H10M 50/20; H10M 50/202; H10M 50/204; B25B 11/00; B23K 37/04; B23K 37/0452
See application file for complete search history.

(56) References Cited

U.S. PATENT DOCUMENTS

| | | | |
|---|---|---|---|
| 2011/0133454 A1* | 6/2011 | Vo | F03D 9/25 290/55 |
| 2017/0173779 A1* | 6/2017 | Luis y Prado | B25H 1/10 |
| 2022/0173469 A1* | 6/2022 | Wynn | H01M 50/207 |

FOREIGN PATENT DOCUMENTS

| | | | | |
|---|---|---|---|---|
| CN | 104551543 A | * | 4/2015 | ............ B25B 11/00 |
| CN | 210824250 U | * | 6/2020 | |
| CN | 211516544 U | * | 9/2020 | |
| CN | 215114472 U | * | 12/2021 | |

OTHER PUBLICATIONS

English translation of CN-215114472-U (Year: 2021).*
English translation of CN-210824250-U (Year: 2020).*

* cited by examiner

*Primary Examiner* — Thang X Le
*Assistant Examiner* — Haidong Zhang
(74) *Attorney, Agent, or Firm* — PATTERSON + SHERIDAN, LLP

(57) ABSTRACT

An electrical module rotisserie assembly for battery module handling and mechanical and electrical testing. The electrical module rotisserie assembly includes a rotatable frame structure with various sliders and insulated joints to provide an adjustable platform to fit any size electrical module and permit access to any surface of the electrical module for various testing and validation activities in an electrically-isolated manner. A plurality of modular adjustable hold down clamps secure the electrical module to the rotatable structure and slide along the structure to accommodate different electrical modules that may have different mounting formats. These adjustable hold down clamps benefit from polymer module pins that may be customized to fit any electrical module design and create electrical isolation for sensitive electrical testing. This rotisserie structure is mounted to motors, hand cranks, and/or other such rotational mechanisms to enable multiple rotational orientations and easy access to all electrical module surfaces.

15 Claims, 10 Drawing Sheets

ELECTRICAL MODULE ROTISSERIE ASSEMBLY AND ASSOCIATED METHOD OF USE

INTRODUCTION

The present disclosure relates generally to the automotive and battery module manufacturing and testing fields. More particularly, the present disclosure relates to an electrical module rotisserie assembly for the manipulation and testing of electrical modules such as battery modules for electric vehicles and the like.

The manufacturing of electrical modules such as high voltage battery modules for electric vehicles and the like includes comprehensive testing and validation. This testing and validation regimen can include instrumenting and performing sensitive mechanical and electrical measurements on battery modules that may be large and multi-layer. These high voltage battery modules can be extraordinarily difficult to maneuver into position for instrumenting and testing, making the use of special equipment necessary to gain access to all battery module surfaces (e.g., the bottom of a battery module), as well as to provide electrical isolation for sensitive electrical measurements.

The present background is provided as illustrative environmental context only. It will be readily apparent to those of ordinary skill in the art that the principles and concepts of the present disclosure may be implemented in other environmental contexts equally, without limitation.

SUMMARY

The present disclosure provides an electrical module rotisserie assembly for electrical module handling and mechanical and electrical testing. The electrical module rotisserie assembly includes a rotatable frame structure with various sliders and insulated joints to provide an adjustable platform to fit any size electrical module and permit access to any surface of the electrical module for various testing and validation activities in an electrically-isolated manner. A plurality of modular adjustable hold down clamps secure the electrical module to the rotatable structure and slide along the structure to accommodate different electrical modules that may have different mounting formats. These adjustable hold down clamps benefit from polymer module pins that may be customized to fit any electrical module design and create electrical isolation for sensitive electrical testing. This rotisserie structure is mounted to motors, hand cranks, and/or other such rotational mechanisms to enable multiple rotational orientations and easy access to all electrical module surfaces.

In one illustrative embodiment, the present disclosure provides an electrical module rotisserie assembly including a base structure and a frame structure rotatably coupled to the base structure and adapted to be coupled to an electrical module wherein a dimension of the frame structure is adjustable in a direction perpendicular to an axis of rotation of the frame structure such that the frame structure is adaptable to accommodate electrical modules of different sizes. The electrical module rotisserie assembly further includes a rotation mechanism disposed between the base structure and the frame structure and operable for rotating the frame structure about the axis of rotation with respect to the base structure. The frame structure includes at least one fixed end rail disposed perpendicular to the axis of rotation. The frame structure further includes at least one slider rail disposed parallel to the axis of rotation and translatably coupled to the at least one fixed end rail. The frame structure additionally includes at least one clamp assembly coupled to the at least one slider rail and adapted to be secured to a flange coupled to the electrical module. The at least one clamp assembly includes a mounting pin adapted to engage a mounting hole formed in the flange coupled to the electrical module. The base structure may include at least one horizontal member and a pair of vertical members, wherein the axis of rotation of the frame structure is disposed between the pair of vertical members. The base structure may alternatively include at least one vertical member and a pair of horizontal members, wherein the axis of rotation of the frame structure is disposed between the pair of horizontal members. The electrical module is electrically isolated from the base structure via one or more intervening insulating members.

In another illustrative embodiment, the present disclosure provides a method for testing an electrical module, the method including coupling the electrical module to a frame structure rotatably coupled to a base structure about an axis of rotation, testing the electrical module in a first rotational orientation of the frame structure with respect to the base structure, rotating the frame structure with respect to the base structure, and testing the electrical module in a second rotational orientation of the frame structure with respect to the base structure. The method may further include adjusting a dimension of the frame structure in a direction perpendicular to the axis of rotation such that the frame structure accommodates the electrical module. The frame structure may include at least one fixed end rail disposed perpendicular to the axis of rotation. The frame structure may further include at least one slider rail disposed parallel to the axis of rotation and translatably coupled to the at least one fixed end rail. The frame structure may further include at least one clamp assembly coupled to the at least one slider rail and adapted to be secured to a rail coupled to the electrical module. The at least one clamp assembly includes a mounting pin adapted to engage a hole formed in the rail coupled to the electrical module. The base structure may include at least one horizontal member and a pair of vertical members, wherein the axis of rotation of the frame structure is disposed between the pair of vertical members. The base structure may alternatively include at least one vertical member and a pair of horizontal members, wherein the axis of rotation of the frame structure is disposed between the pair of horizontal members. The method may further include electrically isolating the frame structure from the base structure using one or more intervening insulating members.

In a further illustrative embodiment, the present disclosure provides a battery assembly including an electrical module and a flange structure coupled to an exterior surface of the electrical module and defining at least one mounting hole or recess adapted to receive a pin or protrusion of a clamp assembly of a rotatable frame structure, thereby securing the electrical module to the rotatable frame structure for testing of the electrical module in different rotational orientations. The battery assembly further includes an electrical insulator disposed between the flange structure and the clamp assembly adapted to electrically isolate the electrical module from the rotatable frame structure.

BRIEF DESCRIPTION OF THE DRAWINGS

The present disclosure is illustrated and described herein with reference to the various drawings, in which like reference numbers are used to denote like assembly components/method steps, as appropriate, and in which.

DETAILED DESCRIPTION

The present disclosure provides an electrical module rotisserie assembly for electrical module handling and mechanical and electrical testing and maintenance. The electrical module rotisserie assembly includes a rotatable frame structure with various sliders and insulated joints to provide an adjustable platform to fit any size electrical module, such as a battery module, and permit access to any surface of the electrical module for various testing and validation activities in an electrically-isolated manner. A plurality of modular adjustable hold down clamps secure the electrical module to the rotatable structure and slide along the structure to accommodate different electrical modules that may have different mounting formats. These adjustable hold down clamps benefit from polymer module pins that may be customized to fit any electrical module design and create electrical isolation for sensitive electrical testing or maintenance. This rotisserie structure is mounted to motors, hand cranks, and/or other such rotational mechanisms to enable multiple rotational orientations and easy access to all electrical module surfaces. For example, the electrical module rotisserie assembly of the present disclosure may be used to easily access the top and bottom surfaces of a multi-level battery module for instrumenting, weld testing, electrical testing, maintenance, etc.

Figure 1:
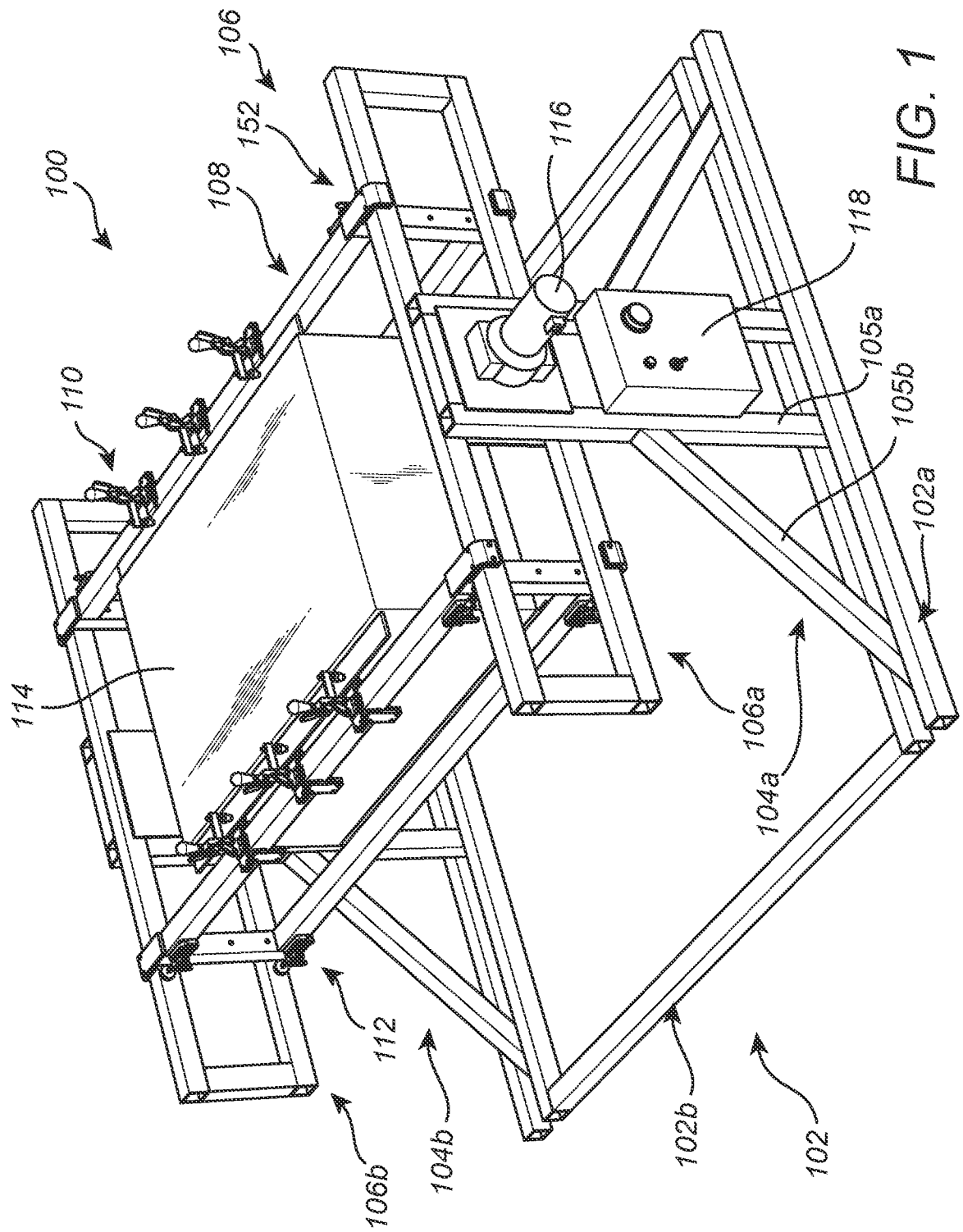
FIG. 1 is a perspective view of the front side of one illustrative embodiment of the electrical module rotisserie of the present disclosure.

Referring now specifically to FIG. 1, in one illustrative embodiment, the electrical module rotisserie assembly 100 includes a base structure 102 that includes support structures 104a and 104b, a rotatable frame structure 106 including rotatable end rails or walls 106a and 106b, a plurality of adjustable slider rails 108, a plurality of adjustable hold down clamps 110 (i.e., clamp assemblies), and a plurality of linear clamps 112. The support structures 104a and 104b are rigidly connected to the base structure 102 to form the non-rotating portion of the electrical module rotisserie assembly 100, the connection being via welds, rivets, bolts and nuts, or any other method of rigid connection known to one of ordinary skill in the art. In various embodiments, the base structure 102 and the support structures 104a and 104b are constructed using rigid metal tubing or the like. The rotating portion (i.e., frame structure) 106 of the electrical module rotisserie assembly 100 includes the end rails or walls 106a and 106b, the slider rails 108, and the components affixed thereon.

The base structure 102 forms a support structure that may be disposed on a horizontal surface, such as a floor or the ground, or be coupled to a vertical surface, such as a wall. Here, the base structure 102 is a rectangular frame and includes a plurality of end members 102a and spanning members 102b disposed between the plurality of end members 102a. The base structure 102 may include support structures 104a and 104b which are oriented vertically as seen in the illustrated embodiment in FIG. 1. In this illustrated embodiment, the support structures 104a and 104b are fixed to the plurality of end members 102a of the base structure 102. In this illustrative embodiment, the support structures 104a and 104b include a plurality of supporting members 105a and reinforcing members 105b. The supporting members 105a extend perpendicular to the axis of rotation of the rotatable frame structure 106 of the electrical module rotisserie assembly 100. In other embodiments, the support structures 104a and 104b may extend horizontally from a wall or other vertical member making up the base structure 102. The support structures 104a and 104b may also be a solid structure such as a wall or other structure of the like. The axis of rotation of the frame structure 106 is disposed between the support structures 104a and 104b.

The rotatable frame structure 106 of the electrical module rotisserie assembly 100 includes a plurality of slider rails 108 which are positioned parallel to one another and coupled to the end rails 106a and 106b. This connection being made at the ends of the slider rails 108 to form a sliding joint 152, thus allowing them to be adjusted independently to accommodate any size electrical module such as a battery module 114, as described in greater detail herein below. When the slider rails 108 and the end rails 106a and 106b are coupled, they form a frame like structure in which the battery module 114 is secured via the plurality of adjustable hold down clamps 110. The plurality of adjustable hold down clamps 110 are coupled to the slider rails 108 via a sliding joint to allow the adjustable hold down clamps 110 to be adjusted to secure any size battery module 114. A plurality of linear clamps 112 are arranged at each of the ends of the slider rails 108 to allow a user to lock the slider rails 108 at a desired position along the end rails 106a and 106b.

The frame structure 106 of the electrical module rotisserie assembly 100 is coupled to the support structures 104a and 104b via pin, motor 116, hand crank, or any other rotation mechanism known to one of ordinary skill in the art. The rotation of the frame structure 106 may be driven by a motor 116, hand crank, or any other torque inducing mechanism or device known to one of ordinary skill in the art. The present disclosure describes a motor 116 fixed to the first support structure 104a and a motor controller 118 also fixed to the first support structure 104a. This motor 116 being rigidly fixed to the support structure 104a with its shaft disposed through the support structure 104a thus driving the corresponding first end rail 106a connected thereon. In various embodiments, the motor 116 may include an angle indicator (not pictured) for fine tuning the rotation angle of the frame structure 106 of the electrical module rotisserie assembly 100. In other embodiments, this motor system may be replaced with a hand crank fixed to the first support structure 104a with its output shaft again inducing the rotation of the corresponding first end rail 106a affixed thereon thus rotating the frame structure 106 of the electrical module rotisserie assembly 100.

Figure 2:
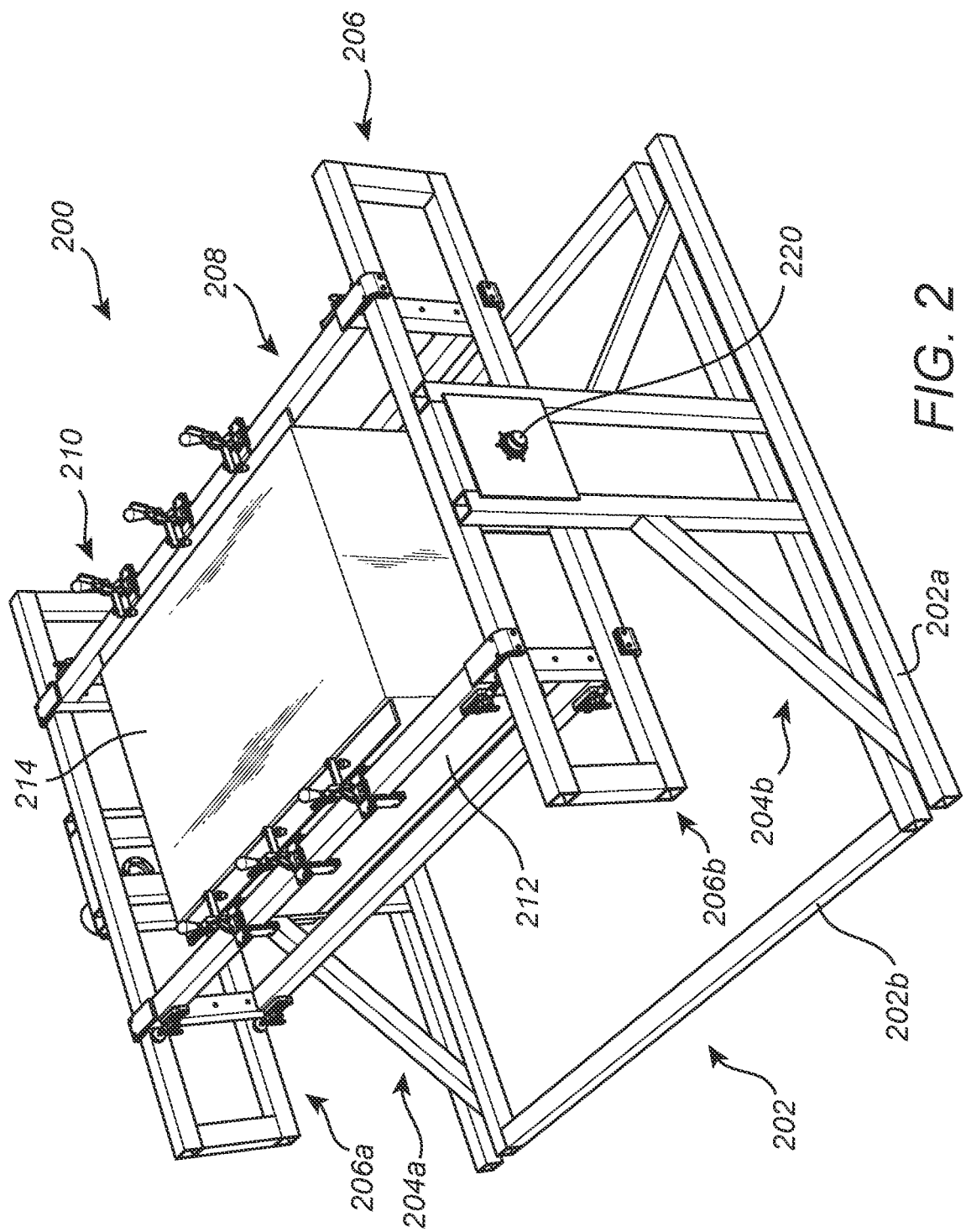
FIG. 2 is a perspective view of the back side of one illustrative embodiment of the electrical module rotisserie of the present disclosure.

Referring now specifically to FIG. 2, the electrical module rotisserie assembly 200 of the present disclosure again includes a base structure 202 that includes a plurality of end members 202a, spanning members 202b disposed between the plurality of end members 202a, and support structures 204a and 204b. The rotatable frame structure 206 of the electrical module rotisserie assembly 200 includes end rails 206a and 206b, slider rails 208, a plurality of adjustable hold down clamps 210, and a plurality of linear clamps 212. The slider rails 208 are positioned parallel to one another and coupled to the two end rails 206a and 206b. This connection being made at the ends of the two slider rails 208 to form a sliding joint, thus allowing them to be adjusted independently to accommodate any size battery module (i.e., electrical module) 214.

A rotary pin assembly 220 serves as a rotatable joint between the second support structure 204b and the second end rail 206b. The rotary pin assembly 220 is designed to support the weight of the rotatable frame structure 206 of the electrical module rotisserie assembly 200 and the battery module 214, or any other electrical module mounted thereon. The rotary pin assembly 220 allows the second end rail 206b to rotate freely, thus allowing the entire rotatable frame structure 206 of the electrical module rotisserie assembly 200 to be controlled by the device or mechanism driving the first end rail 206a.

Figure 3:
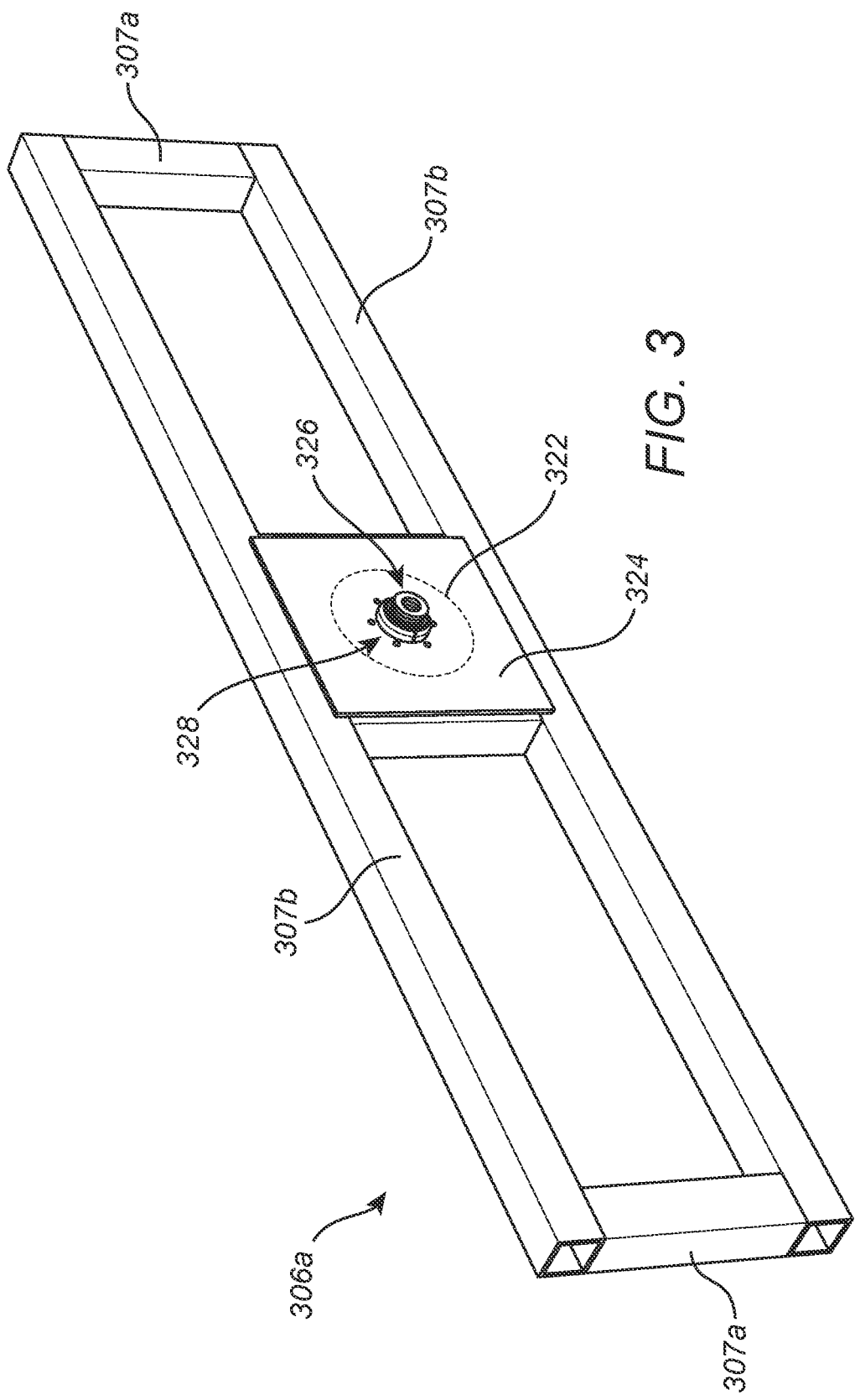
FIG. 3 is a perspective view of a first rotatable support wall of the rotating frame of the present disclosure.

Referring now specifically to FIG. 3, in one illustrative embodiment, the first end rail 306a is shown. A motor shaft adapter 322 is rigidly fixed to a planar member 324 of the first end rail 306a. The motor shaft adapter 322 is fastened to the planar member 324, the connection being via welds, rivets, bolts and nuts, or any other method of rigid connection known to one of ordinary skill in the art. The planar member 324 is rigidly fixed to the first end rail 306a as to transfer torque to the structure. The frame of the first end rail 306a is constructed using rigid metal tubing or the like. The frame of the first end rail 306a is designed to have a smooth surface as to allow the slider rails 108 (FIG. 1) to be easily and accurately adjusted thereon by way of the slider joints to allow for any size battery module 114 (FIG. 1) or other electrical module to be mounted. Here, the end rail 306a is a rectangular frame and includes a plurality of end members 307a and spanning members 307b disposed between the plurality of end members 307a. The end rail 306a is positioned perpendicular to the axis of rotation of the frame structure 106 (FIG. 1), and creates a structure on which the slider rails 108 (FIG. 1) are coupled. This end rail 306a may be any structure such as a frame, solid wall, or other structure of the like.

The motor shaft adapter 322 includes a keyed shaft collar 328 which is adapted to receive a keyed output shaft of the motor 116 (FIG. 1), thus only rotating the frame structure of the electrical module rotisserie assembly 100 (FIG. 1) when torque is applied. A plurality of rotary washers 326 are installed between the first end rail 306a and the first support structure 104a (FIG. 1) at this motor shaft adapter 322 as to allow for smooth rotation. It should be noted that this motor shaft adapter 322 may be replaced by another adapter to receive the output of a different driving mechanism. For example, a hand crank may replace the motor 116 (FIG. 1) to induce torque on the rotatable frame structure 106 of the electrical module rotisserie assembly 100 (FIG. 1) to adjust the position of the battery module 114 (FIG. 1) or other electrical module mounted thereon.

Figure 4:
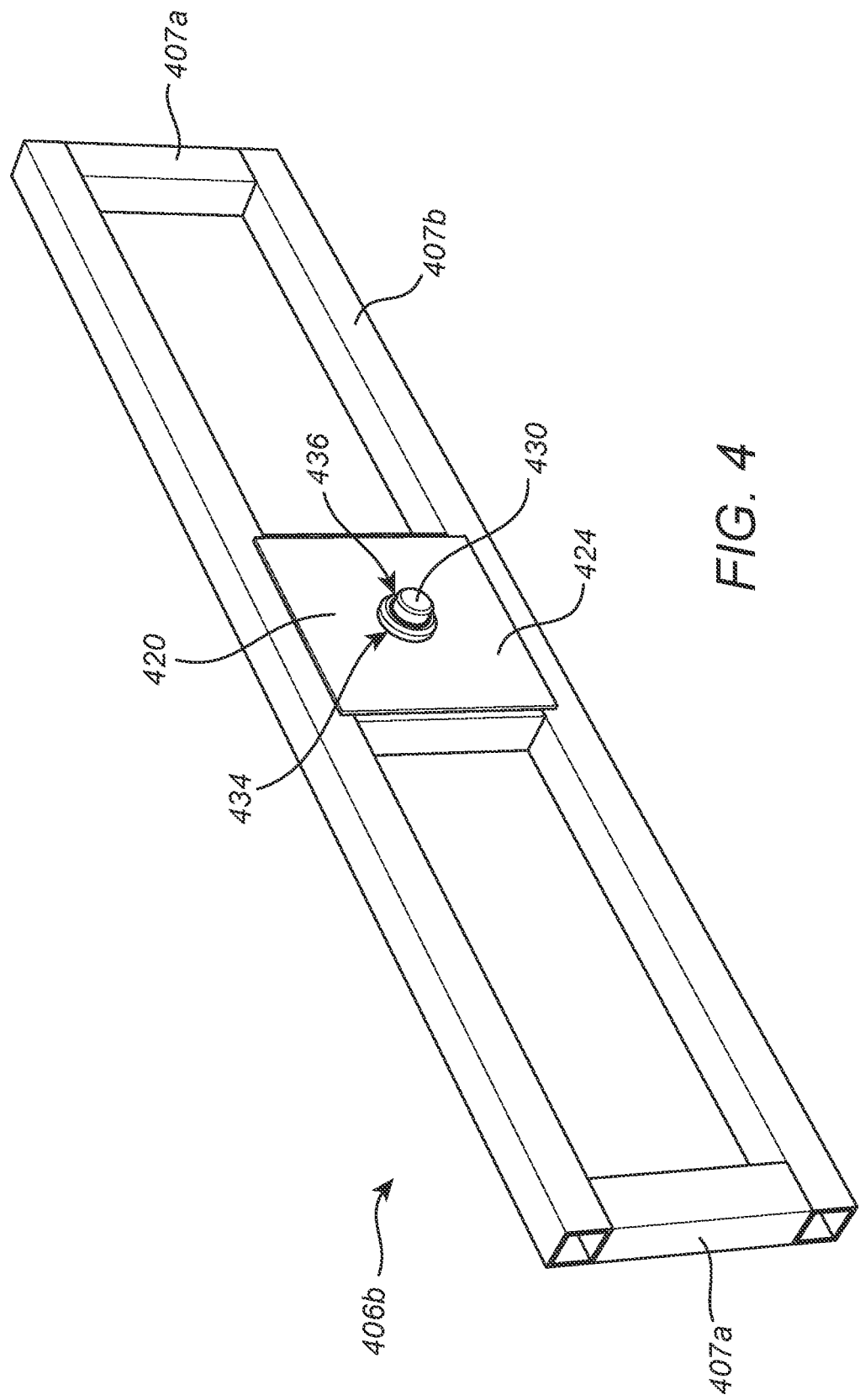
FIG. 4 is a perspective view of a second rotatable support wall of the rotating frame of the present disclosure.

Referring now specifically to FIG. 4, in one illustrative embodiment, the second end rail 406b includes a rotary pin assembly 420. The rotary pin assembly 420 includes a rotary pin 430 disposed through a planar member 424. This rotary pin 430 acts as a rotatable joint between the second end rail 406b and the second support structure 104b (FIG. 1). The planar member 424 is fixed to the second end rail 406b and reinforces the structure to be able to support the weight of the battery module 114 (FIG. 1) or other electrical module. The frame of the second end rail 406b is constructed using rigid metal tubing or the like. The frame of the second end rail 406b is designed to have a smooth surface as to allow the slider rails 108 (FIG. 1) to be easily and accurately adjusted thereon by way of the slider joints to allow for any size battery module 114 (FIG. 1) or other electrical module to be mounted. Here, the end rail 406b is a rectangular frame and includes a plurality of end members 407a and spanning members 407b disposed between the plurality of end members 407a. The end rail 406b is positioned perpendicular to the axis of rotation of the frame structure 106 (FIG. 1), and creates a structure on which the slider rails 108 (FIG. 1) are coupled. This end rail 406b may be any structure such as a frame, solid wall, or other structure of the like.

The rotary pin 430 is disposed through the planar member 424 of the second end rail 406b and fixed to the second support structure 104b (FIG. 1). This rotary pin 430 is designed to be strong enough to support the weight of the frame structure 106 (FIG. 1) of the electrical module rotisserie assembly 100 (FIG. 1) as well as the weight of the electrical module such as a battery module 114 (FIG. 1) attached thereon. The second end rail 406b also includes an oil embedded bushing 434 fixed to the planar member 424 which the rotary pin 430 is disposed through to allow for smooth operation of the frame structure of the electrical module rotisserie assembly 100 (FIG. 1). A retaining ring 436 with a diameter greater than the inside diameter of the oil embedded bushing 434 is positioned inside of a notch at the end of the rotary pin 430 to keep the second end rail 406b rotatably fixed to the second support structure 104b (FIG. 1). This allows the second end rail 406b to rotate freely, thus allowing it to be rotated by the torque introduced to the first end rail 106a.

Figure 5:
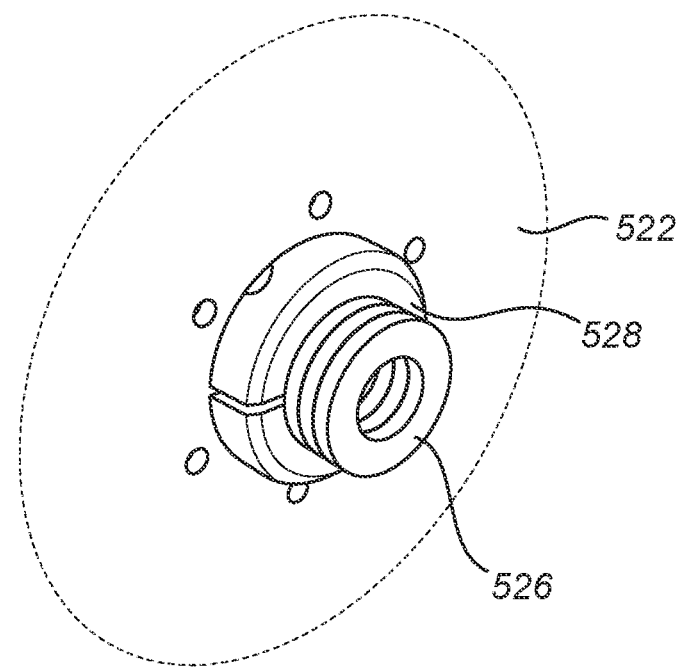
FIG. 5 is a perspective view of the rotation joint of the first rotatable support wall of the present disclosure.

Referring now specifically to FIG. 5, the motor shaft adapter 522 of the electrical module rotisserie assembly of the present disclosure is shown in greater detail. The motor shaft adapter 522 again includes a keyed shaft collar 528 which is adapted to receive a keyed output shaft of the motor 116 (FIG. 1), thus only rotating the frame structure of the electrical module rotisserie assembly 100 (FIG. 1) when torque is applied. A plurality of rotary washers 526 are installed between the first end rail 106a and the first support structure 104a (FIG. 1) at this motor shaft adapter 522. The rotary washers provide a barrier between the first end rail 106a and the first support structure 104a (FIG. 1) to allow the system to rotate without binding. It should be noted again that this motor shaft adapter 522 may be replaced by another adapter to receive the output of a different driving mechanism. For example, a hand crank may replace the motor 116 (FIG. 1) to induce torque on the frame structure of the electrical module rotisserie assembly 100 (FIG. 1) to adjust the position of the electrical module such as a battery module 114 (FIG. 1).

Figure 6:
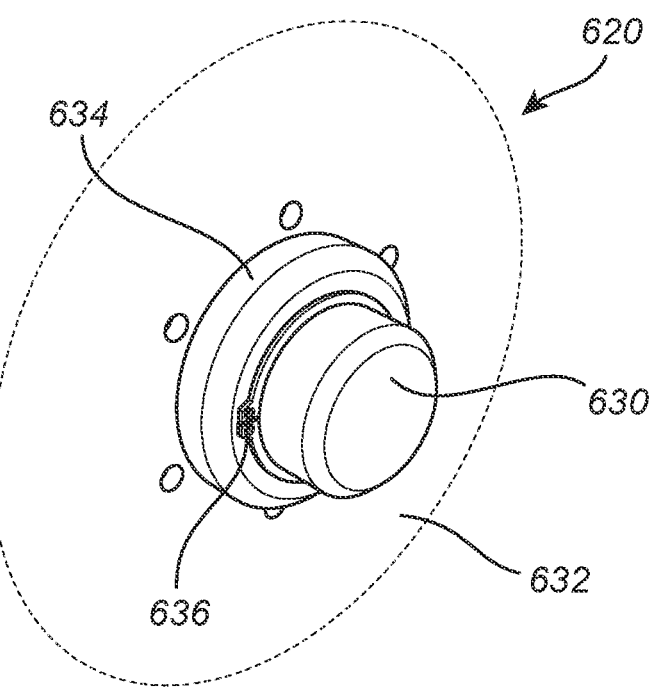
FIG. 6 is a perspective view of the rotation joint of the second rotatable support wall of the present disclosure.

Referring now specifically to FIG. 6, the rotary pin assembly 620 of the electrical module rotisserie assembly of the present disclosure is shown in greater detail. As stated previously, the rotary pin 630 is disposed through the second end rail 106b and fixed to the second support structure 104b (FIG. 1). This rotary pin 630 is designed to be strong enough to support the weight of the frame structure of the electrical module rotisserie assembly 100 (FIG. 1) as well as the weight of the electrical module attached thereon. The rotary pin assembly also includes an oil embedded bushing 634 fixed to the rigid plate 632 which the rotary pin 630 is disposed through. This oil embedded bushing 634 allows for smooth operation of the frame structure of the electrical module rotisserie assembly 100 (FIG. 1). The rotary pin 630 extends past the rigid plate 632 and exposes a circumferential notch at the end of the rotary pin 630. A retaining ring 636 with a diameter greater than the inside diameter of the oil embedded bushing 634 is positioned inside of this notch at the end of the rotary pin 630 to keep the second end rail 106b rotatably fixed to the second support structure 104b (FIG. 1). This rotary pin assembly 620 allows the second end rail 106b to freely rotate, thus allowing it to be rotated by the torque introduced to the first end rail 106a.

Figure 7:
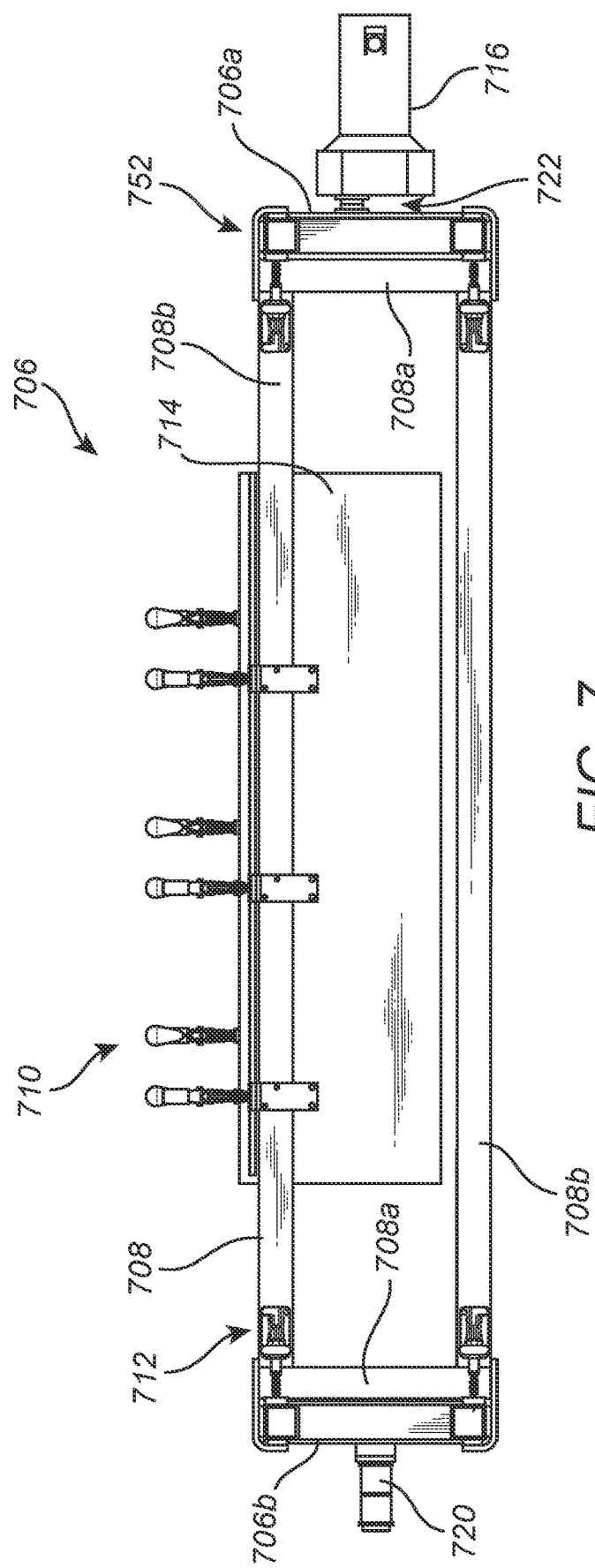
FIG. 7 is a side plan view of the rotating frame portion of the electrical module rotisserie assembly of the present disclosure.

Referring now specifically to FIG. 7, a side view of the frame structure of the electrical module rotisserie assembly of the present disclosure is shown. The frame structure of the electrical module rotisserie assembly 100 includes the end rails 706a and 706b, the slider rails 708, and all components fixed thereon, such as the plurality of adjustable hold down clamps 710 and the plurality of linear clamps 712. The slider rails 708 are shown coupled to the end rails 706a and 706b via sliding joints 752. Here, the slider rails 708 are a rectangular frame and include a plurality of end members 708a and spanning members 708b disposed between the plurality of end members 708a. The slider rails 708 are positioned parallel to the axis of rotation of the frame structure 706, and create a structure on which the adjustable hold down clamps 710 and linear clamps 712 are coupled. The slider rails 708 may be any structure such as a frame, solid wall, or other structure of the like. The plurality of adjustable hold down clamps 710 are shown along the top spanning member 708b of the slider rails 708. These adjustable hold down clamps 710 are connected to the slider rails 708 via sliding joints which are lined with rigid polymer to allow the adjustable hold down clamps 710 to easily slide and secure any size electrical module, as described in greater detail herein below. A battery module 714 is shown in its secured position, being held by the plurality of adjustable hold down clamps 710. In the position depicted in FIG. 7, the frame structure of the electrical module rotisserie assembly is horizontal to show the open structure of the system. This open structure is designed to allow access to all surfaces of the battery module 714. When the frame structure of the electrical module rotisserie assembly 100 is rotated it permits access to the bottom of the battery module 714 as well.

It will be appreciated that a different number of adjustable hold down clamps 710 may be used for different situations or different electrical modules. It will also be appreciated that the adjustable hold down clamps 710 may occupy any position along the length of the slider rails 708 and not limited to the positions depicted in FIG. 7. In some examples, the battery module 714 being supported may be any electrical module, and is larger or smaller than the one depicted, thus requiring different arrangements and number of the adjustable hold down clamps 710.

A plurality of linear clamps 712 are arranged and fixed at each of the ends of the slider rails 708. The present disclosure depicts four linear clamps 712 on each slider rail 708 which are arranged with two at each end of the slider rails 708 to engage the end rails 706a and 706b, thus preventing the slider rails from sliding. When engaged, the linear clamps 712 extend to grip the surface of the end rails 706a and 706b acting as a friction lock. It will be appreciated that any number and any arrangement of linear clamps may be used for this purpose, or any other slide locking mechanism known to one of ordinary skill in the art.

The electrical module rotisserie assembly 100 of the present disclosure may include a motor 716 which engages and drives the first end rail 706a and a rotary pin assembly 720 disposed through the second end rail 706b which is free to rotate. The end rails 706a and 706b are linked to each other via the slider rails 708. This connection causes the entire frame structure 706 to rotate when torque is introduced at the first end rail 706a. The motor 716 may, however, be replaced by any other device or mechanism to produce rotation known to one of ordinary skill in the art such as a hand crank. The motor shaft adapter 722 and rotary pin assembly 720 support the frame structure of the electrical module rotisserie assembly 100.

Figure 8:
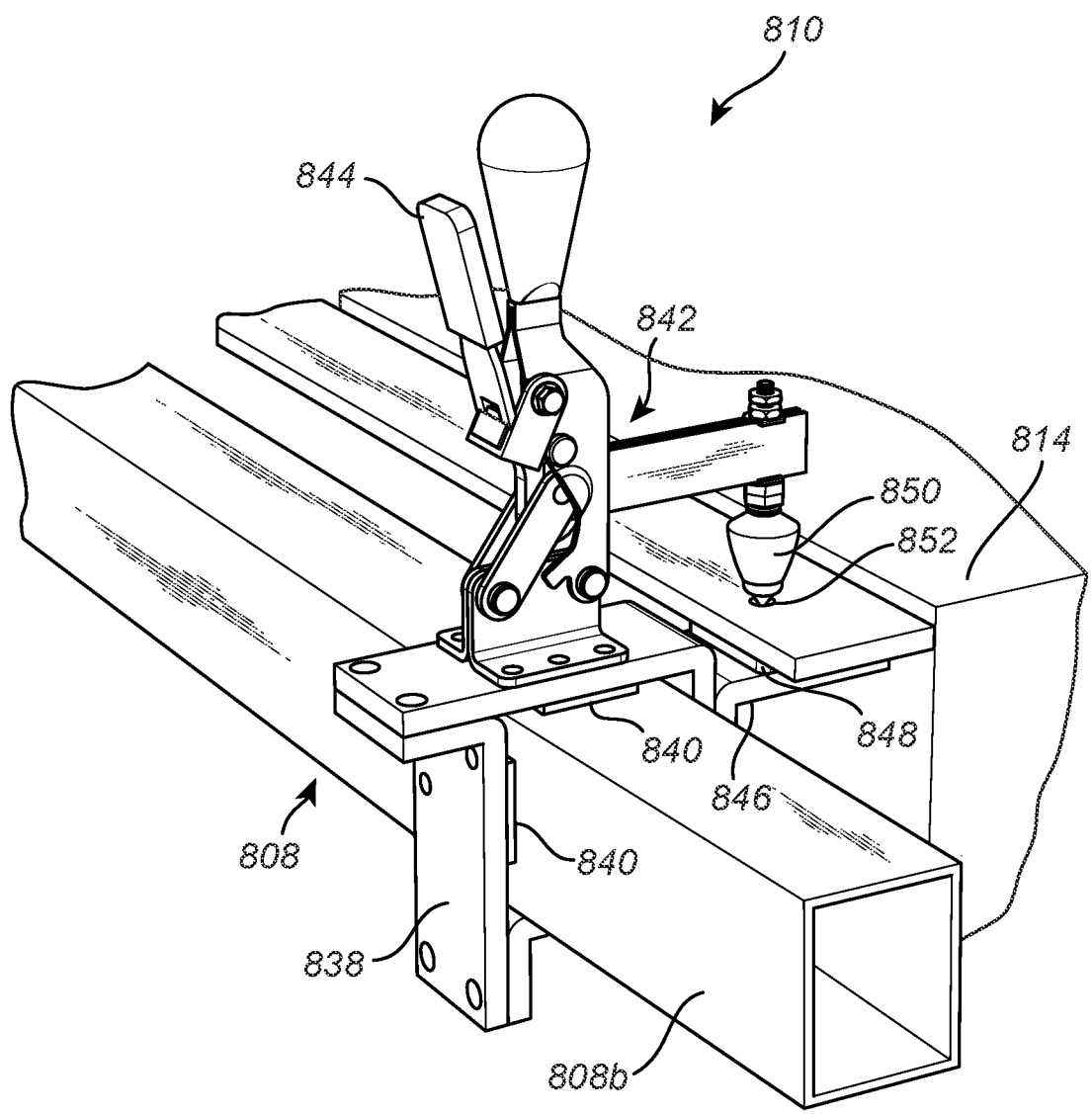
FIG. 8 is a perspective view of an adjustable hold down clamp of the present disclosure.

Now referring specifically to FIG. 8, one of the adjustable hold down clamps 810 (i.e., clamp assembly) is in a closed or clamped position. In various embodiments the adjustable hold down clamps 810 are mounted on top of slider rails 808. The sliding joint includes a sleeve 838 which rides on the top spanning member 808b of the slider rails 808. The present disclosure shows these sleeves 838 being constructed of metal brackets, but it shall be known that these sleeves 838 may be constructed of any rigid material of the like. A plurality of intervening isolating members 840 are arranged along the inside surface of the sleeves 838 to allow the sliding joints to slide across the length of the slider rails 808 without binding while also providing electrical isolation for performing sensitive electrical measurements on an electrical module such as the battery module 814. The intervening isolating members 840 may be constructed from any high strength low friction material, for example Delrin polymer. In the depiction of FIG. 8, the sliding joint which includes the sleeve 838 and intervening isolating members 840 is shown to wrap around the top spanning member 808b of the slider rail 808, this sliding joint is not limited to such configuration but also includes any other manner of constructing a slider joint for example a linear rail or other linear joints of the like.

Modular clamps 842 are provided to clamp and secure the structure of the battery module 814. The modular clamps 842 are rigidly fixed to the top surface of the sleeve 838 to allow the modular clamps 842 to slide along the slider rails 808, the connection being via welds, rivets, bolts and nuts, or any other method of rigid connection known to one of ordinary skill in the art. The modular clamps 842 include a locking handle mechanism 844 to allow a user to clamp the battery module 814 and lock it in place. In the present embodiment, the modular clamp 842 is a conventional vertical hold down clamp. It will be appreciated that this clamp may be replaced with other hold down clamp such as a horizontal hold down clamp or other clamps of the like.

The adjustable hold down clamps 810 include a bracket 846, a module pin 848, and a clamp foot 850. The bracket 846 is fixed to the sleeve 838 and serves as a shelf for the battery module 814 to rest on. The module pin 848 is mounted to the bracket 846 and is adapted to fit into any electrical module attachment style. In the present embodiment, the module pin 848 extends through a mounting hole 852 in the battery module 814. The clamp foot 850 of the present disclosure includes a hollow tip to receive the protruding end of the module pin 848 thus securing the battery module 814 in place. The module pin 848 also serves as a barrier between the battery module 814 and bracket 846 to provide electrical isolation.

It will be appreciated that the illustrative adjustable hold down clamps 810 may occupy any position along the slider rails 808 and there may be any number of adjustable hold down clamps 810 distributed along the length of the slider rails 808. The distribution and number of adjustable hold down clamps 810 being dependent on the style and size of the battery module 814 or other electrical module to be mounted.

Figure 9:
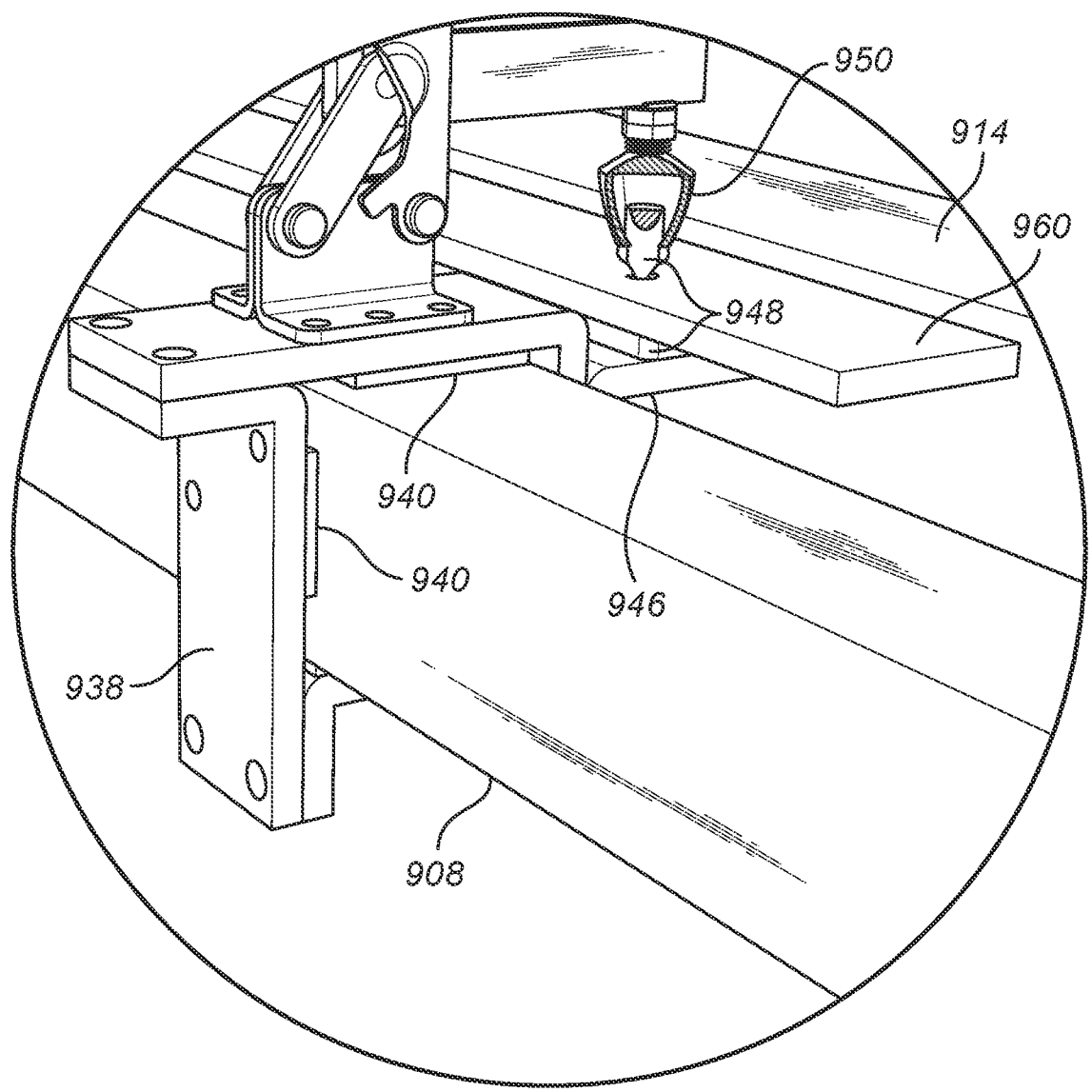
FIG. 9 is a perspective view of one of the adjustable hold down clamps, highlighting the clamp foot to show further detail associated therewith.

Now referring specifically to FIG. 9, a more detailed view of the bracket 946, the module pin 948, and the clamp foot 950 is presented. The module pin 948 is shown in more detail and is displayed protruding through the flange 960 of the battery module 914. The barrier that the module pin 948 creates between the battery module 914 and the bracket 946 can be seen more clearly. The module pin 948 of the present disclosure is a 3D printed polymer as to create electrical isolation but can be manufactured from any adequate and nonconductive material of the like. The clamp foot 950 is displayed in a partial cross section view to show the module pin 948 inserted into the hollow portion of the clamp foot 950 when the adjustable hold down clamp 810 is engaged. Also more clearly seen here are the intervening isolating members 940 fixed to the inside surface of the sleeve 938. This again permits the sliding joint to slide freely along the frame of the slider rails 908 and allow the plurality of adjustable hold down clamps 110 (FIG. 1) to occupy any position along the slider rails 908 to accommodate any size electrical module such as the battery module 914. The intervening isolating members 940 also serve to create electrical isolation between the parts to allow for sensitive electrical testing of the battery module 914.

Figure 10:
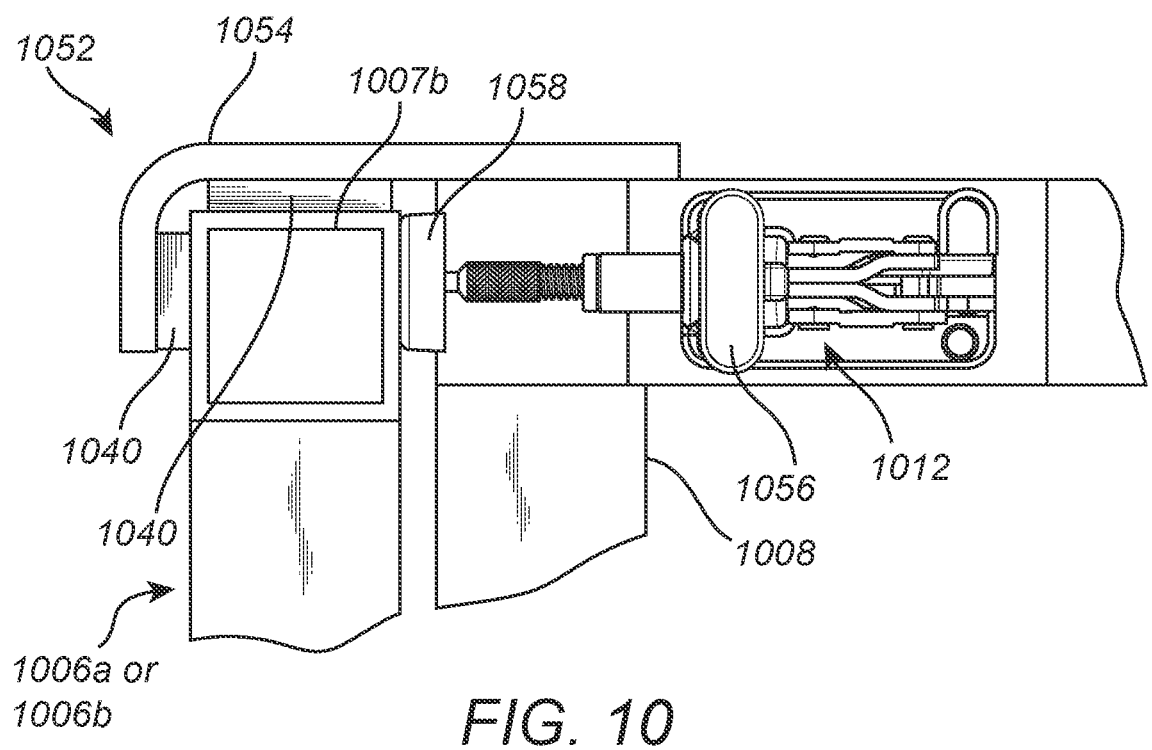
FIG. 10 is a detailed side view of a joint between a slider rail and one of the rotatable support walls of the present disclosure.

Referring now specifically to FIG. 10, the sliding joint 1052 between the end rails 1006 and the slider rails 1008 is presented. The slider rails 1006 include a slider joint 1052 fixed to each corner which allows the slider rails 1008 to slide linearly along the length of the end rails 1006. The slider joint 1052 includes a guide 1054 which partially wraps around the spanning member 1007b of the corresponding end rail 1006a and 1006b. The inner surface of the guide 1054 is lined with a plurality of intervening isolating members 1040 which contact the frame of the corresponding end rail 1006 and 1006b and act as a low friction material to allow the slider joint 1052 to slide without binding. The intervening isolating members 1040 also act as a barrier between the components to create electrical isolation. The intervening isolating members 1040 may be constructed from any high strength low friction material of the like, for example, Delrin polymer. The slider joints 1052 fixed to each end of the slider rails 1008 cause the slider rails to be fixed to the end rails 1006a and 1006b while only allowing them to slide along the lengths of the end rails 1006a and 1006b. It will be appreciated that the slider rails 1008 may occupy any position along the length of the end rails 1006a and 1006b to accommodate any size electrical module.

The slider rails 1008 include a plurality of linear clamps 1012. In this illustrative embodiment, the plurality of linear clamps 1012 are arranged and rigidly fixed to each corner of the slider rails 1008. The linear clamps 1012 each include a locking handle 1056 and a rubber stopper 1058. In the present disclosure the linear clamps 1012 are common locking linear clamps, but it should be known that any clamp or locking mechanism may be used for the purpose. The rubber stopper 1058 is fixed to the end of the linear clamp 1012 and extends to grip the frame of the corresponding end rail 1006a and 1006b when the linear clamp 1012 is engaged. It will be appreciated that any number of linear clamps 1012 may be used depending on the desired configuration.

Figure 11:
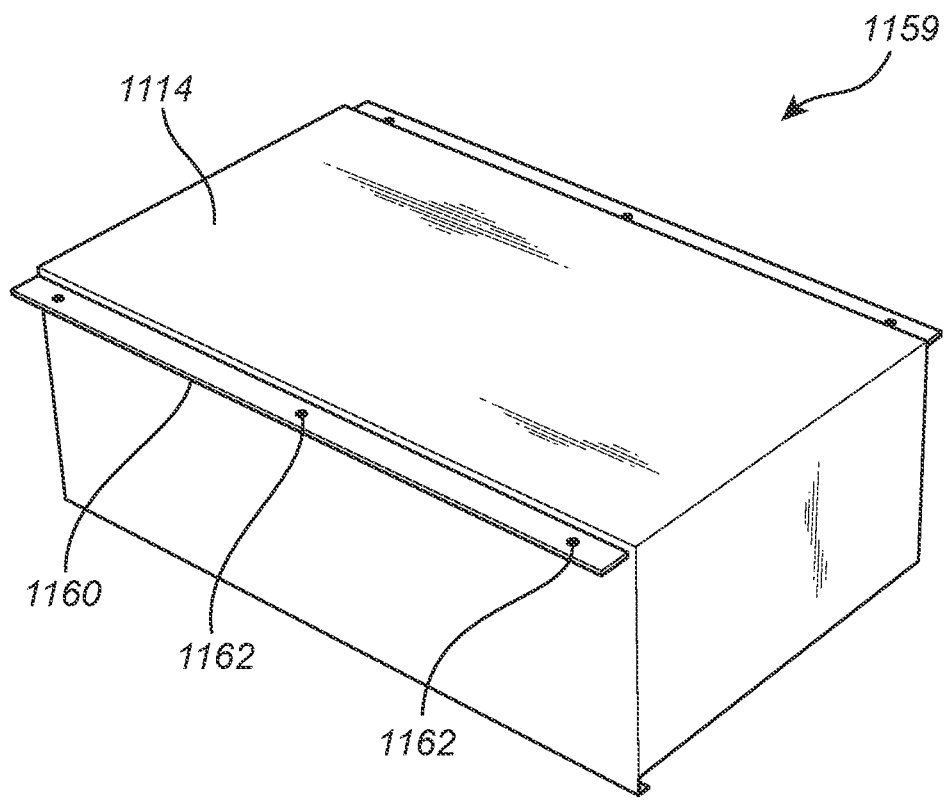
FIG. 11 is a perspective view of one illustrative embodiment of a battery module that may be mounted on the electrical module rotisserie assembly of the present disclosure.

Referring now specifically to FIG. 11, a battery assembly 1159 includes a battery module 1114, flanges 1160, and a plurality of mounting holes 1162. The flanges 1160 extend from the exterior surface of the battery module 1114 and support the weight of the battery module 1114 when it is installed, for example, into an electric vehicle. The plurality of mounting holes 1162 are disposed through the flanges 1160 to allow the battery module 1114 to be installed using bolts, rivets, or any other fastening method. It will be known that there may be any number of mounting holes 1162 that may be arranged in any manner along the flanges 1160. The mounting holes 1162 may also be replaced by other battery module attachment styles.

The electrical module rotisserie assembly 100 (FIG. 1) of the present disclosure utilizes the flanges 1160 (i.e., flange structure) and mounting holes 1162 to hold and secure the battery module 1114. The plurality of adjustable hold down clamps 810 (FIG. 8) grip the battery module 1114 by the flanges 1160. The module pins 848 (FIG. 8) insert into the mounting holes 1162 for alignment and electrical isolation. Again, the module pins 848 (FIG. 8) may be modified to accommodate different battery module attachment styles. This depiction of a battery module 1114 is just one of many different sizes and styles of electrical modules. The electrical module rotisserie assembly 100 (FIG. 1) of the present disclosure is configurable via the plurality of sliding joints to accommodate these different sizes and styles.

It will be appreciated that although the present disclosure is described with reference to a battery module, the electrical module rotisserie assembly of the present disclosure may be used with any module having an acceptable form factor as described herein, particularly when electrical isolation is necessary for maintenance, testing, or validation and access to multiple surfaces is desired.

Figure 12:
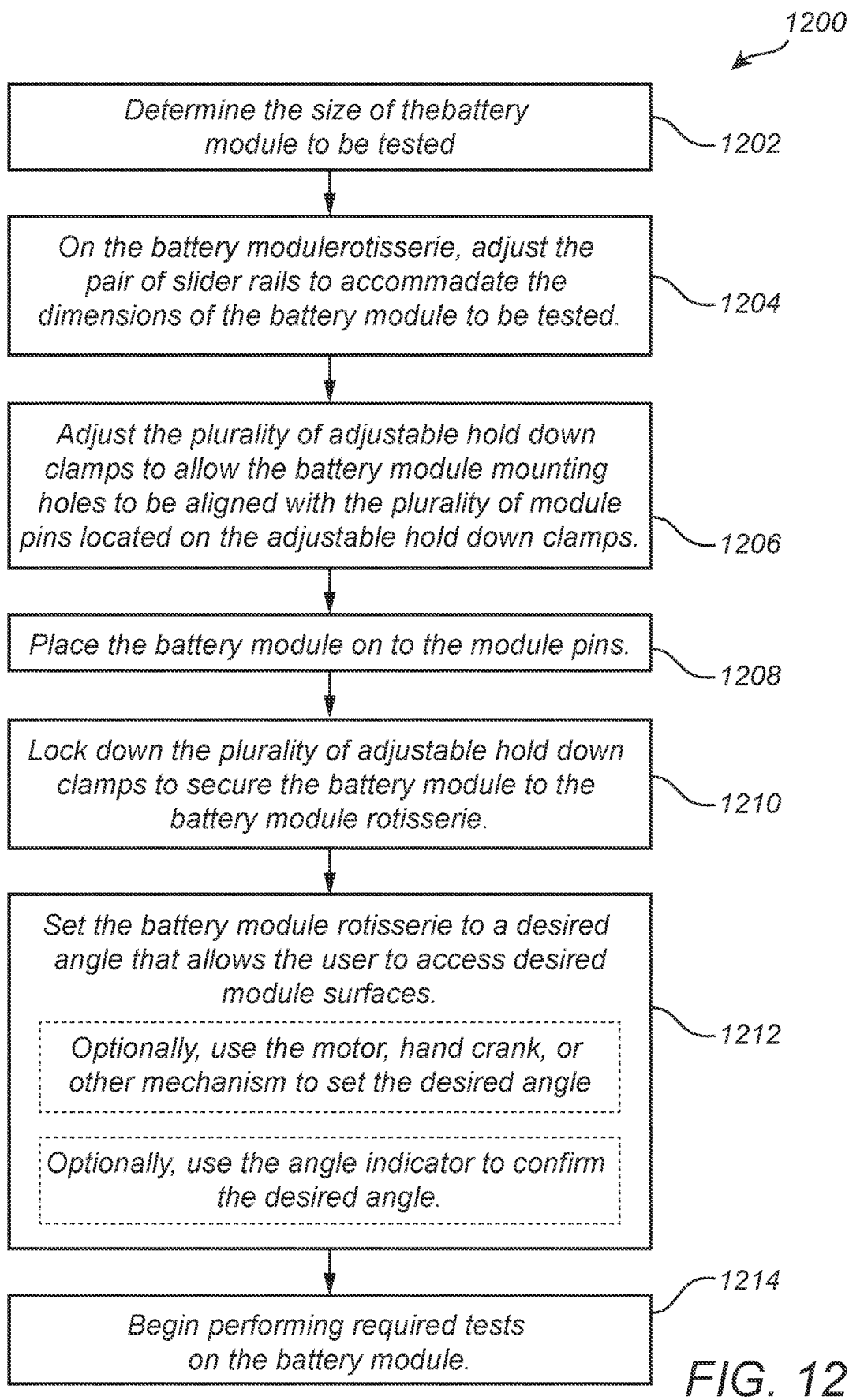
FIG. 12 is a flow chart of a method of use of the electrical module rotisserie assembly of the present disclosure.

Referring now specifically to FIG. 12, the method 1200 of using the electrical module rotisserie assembly of the present disclosure is presented in a flow chart. Initially the size of the battery module, or any other electrical module, to be tested is determined 1202. Once the size of the battery module is established, the electrical module rotisserie assembly can be modified accordingly 1204. The slider rails are positioned precisely apart as to permit the battery module to fit in the rotisserie and allow the battery module flange to sit onto the brackets. The plurality of adjustable hold down clamps are adjusted to allow the battery module mounting holes to be aligned with the plurality of module pins located on the adjustable hold down clamps 1206. Note that in some cases the battery module (i.e., electrical module) will have a different configuration to the present mounting holes. In the case of a different configuration, the module pins are replaced with a comparable structure to accommodate the different battery module configuration. The battery module is then lowered onto the module pins 1208 and the adjustable hold down clamps are locked down to couple the battery module onto the electrical module rotisserie assembly 1210. Again, it shall be noted that there may be a different number of adjustable hold down clamps depending on the electrical module being fitted. Once the battery module is secured to the electrical module rotisserie assembly, the frame structure of the electrical module rotisserie assembly can be rotated to a desired angle to allow a user to access any surface of the battery module 1212. The angle of the electrical module rotisserie assembly is set with a motor, hand crank, or other device or mechanism known to one of ordinary skill in the art. Optionally, an angle indicator is used to confirm the desired angle of the electrical module rotisserie assembly. Next, the battery module may be tested, analyzed, or have various other procedures performed to it.

Although the present disclosure is illustrated and described herein with reference to illustrative embodiments and specific examples thereof, it will be readily apparent to those of ordinary skill in the art that other illustrative embodiments and examples may perform similar functions and/or achieve like results. All such equivalent illustrative embodiments and examples are within the spirit and scope of the present disclosure, are contemplated thereby, and are intended to be covered by the following non-limiting claims for all purposes.

What is claimed is:

1. An electrical module rotisserie assembly, comprising:
a base structure; and
a frame structure rotatably coupled to the base structure and adapted to be coupled to an electrical module, the frame structure comprising:
at least one end rail disposed perpendicular to an axis of rotation of the frame structure, and
at least one slider rail disposed parallel to the axis of rotation and translatably coupled to the at least one end rail,
wherein a dimension of the frame structure is adjustable in a direction perpendicular to the axis of rotation such that the frame structure is adaptable to accommodate electrical modules of different sizes.

2. The electrical module rotisserie assembly of claim 1, further comprising a rotation mechanism disposed between the base structure and the frame structure and operable for rotating the frame structure about the axis of rotation with respect to the base structure.

3. The electrical module rotisserie assembly of claim 1, wherein the frame structure further comprises at least one clamp assembly coupled to the at least one slider rail and adapted to be secured to a flange coupled to the electrical module.

4. The electrical module rotisserie assembly of claim 3, wherein the at least one clamp assembly comprises a module pin adapted to engage a mounting hole formed in the flange coupled to the electrical module.

5. The electrical module rotisserie assembly of claim 1, wherein the electrical module is a battery module.

6. The electrical module rotisserie assembly of claim 1, wherein the base structure comprises at least one horizontal member and a pair of vertical members, wherein the axis of rotation of the frame structure is disposed between the pair of vertical members.

7. The electrical module rotisserie assembly of claim 1, wherein the base structure comprises at least one vertical member and a pair of horizontal members, wherein the axis of rotation of the frame structure is disposed between the pair of horizontal members.

8. The electrical module rotisserie assembly of claim 1, wherein the electrical module is electrically isolated from the base structure via one or more intervening isolating members.

9. A method for testing an electrical module, comprising:
coupling the electrical module to a frame structure rotatably coupled to a base structure about an axis of rotation, wherein a dimension of the frame structure is adjusted in a direction perpendicular to the axis of rotation such that the frame structure accommodates the electrical module, and wherein the frame structure comprises at least one end rail disposed perpendicular to the axis of rotation, and at least one slider rail disposed parallel to the axis of rotation and translatably coupled to the at least one end rail;
testing the electrical module in a first rotational orientation of the frame structure with respect to the base structure;
rotating the frame structure with respect to the base structure; and
testing the electrical module in a second rotational orientation of the frame structure with respect to the base structure.

10. The method of claim 9, wherein the frame structure further comprises at least one clamp assembly coupled to the at least one slider rail and adapted to be secured to a flange coupled to the electrical module.

11. The method of claim 10, wherein the at least one clamp assembly comprises a module pin adapted to engage a hole formed in the flange coupled to the electrical module.

12. The method of claim 9, wherein the base structure comprises at least one horizontal member and a pair of vertical members, wherein the axis of rotation of the frame structure is disposed between the pair of vertical members.

13. The method of claim 9, wherein the base structure comprises at least one vertical member and a pair of horizontal members, wherein the axis of rotation of the frame structure is disposed between the pair of horizontal members.

14. The method of claim 9, further comprising electrically isolating the frame structure from the base structure using one or more intervening isolating members.

15. A battery assembly, comprising:
a battery module;
a flange structure coupled to an exterior surface of the battery module and defining at least one mounting hole or recess adapted to receive a pin or protrusion of a clamp assembly of a rotatable frame structure, thereby securing the battery module to the rotatable frame structure for testing of the battery module in different rotational orientations; and
an isolating member disposed between the flange structure and the clamp assembly adapted to electrically isolate the battery module from the rotatable frame structure.

* * * * *